US008340422B2

(12) United States Patent
Boughorbel (10) Patent No.: US 8,340,422 B2
(45) Date of Patent: Dec. 25, 2012

(54) GENERATION OF DEPTH MAP FOR AN IMAGE

(75) Inventor: Faycal Boughorbel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 849 days.

(21) Appl. No.: 12/514,464

(22) PCT Filed: Nov. 15, 2007

(86) PCT No.: PCT/IB2007/054665
§ 371 (c)(1),
(2), (4) Date: May 12, 2009

(87) PCT Pub. No.: WO2008/062351
PCT Pub. Date: May 29, 2008

(65) Prior Publication Data
US 2010/0046837 A1    Feb. 25, 2010

(30) Foreign Application Priority Data

Nov. 21, 2006 (EP) ..................................... 06124488

(51) Int. Cl.
*G06K 9/34* (2006.01)
(52) U.S. Cl. ........................................................ 382/173
(58) Field of Classification Search .................. None
See application file for complete search history.

(56) References Cited

U.S. PATENT DOCUMENTS

| | | | |
|---|---|---|---|
| 6,157,733 A | 12/2000 | Swain | |
| 6,445,814 B2 * | 9/2002 | Iijima et al. | 382/154 |
| 6,584,219 B1 * | 6/2003 | Yamashita et al. | 382/154 |
| 6,661,914 B2 * | 12/2003 | Dufour | 382/154 |
| 6,661,918 B1 | 12/2003 | Gordon et al. | |
| 6,823,080 B2 * | 11/2004 | Iijima et al. | 382/154 |
| 7,035,451 B2 * | 4/2006 | Harman et al. | 382/154 |
| 7,085,409 B2 * | 8/2006 | Sawhney et al. | 382/154 |
| 2002/0048395 A1 | 4/2002 | Harman et al. | |
| 2006/0119848 A1 * | 6/2006 | Wilson et al. | 356/399 |
| 2006/0152803 A1 | 7/2006 | Provitola | |
| 2007/0003134 A1 * | 1/2007 | Song et al. | 382/154 |

FOREIGN PATENT DOCUMENTS

EP    1612733 A2    1/2006

OTHER PUBLICATIONS

Berretty et al:"Real Time Rendering for Multiview Autostereoscopic Displays"; Proceedings of the SPIE, vol. 6055, pp. 208-219 (2006).

(Continued)

*Primary Examiner* — Samir Ahmed (57) ABSTRACT

An image processing unit comprises a first processing unit (101) which generates a depth indication map for an image. The depth indication map may be, for example, an image object separation mask or a predetermined depth profile or background depth map. A second processing unit (103) generates a modified depth indication map by filtering the depth indication map in response to image characteristics of the image. The image adaptive filtering may, for example, provide a more accurate separation mask and/or may modify the predetermined depth profile to reflect the specific image. A third processing unit (105) generates an image depth map for the image in response to the modified depth indication map. The image depth map comprises data representing a depth of at least one image region of the image. The invention leads to the generation of an improved depth map for an image.

15 Claims, 5 Drawing Sheets

OTHER PUBLICATIONS

Atzpadin et al: "New Concept for Joint Disparity Estimation and Segmentation for Real-Time Video Processing";Proc. of Picture Coding Symposium (PCS), Apr. 2003, pp. 155-160.

Atzpadin et al: "Stereo Analysis by Hybrid Recursive Matching for Real-Time Immersive Video Conferencing"; IEEE Transactions on Circuits and Systems for Video Technology, vol. 14, No. 3, March 2004, pp. 321-334.

Fua, P.: "A Parallel Stereo Algorithm That Produces Dense Depth Maps and Preserves Image Features"; Machine Vision and Applications (1993), vol. 6, pp. 35-49.

Xiao et al: "Bilateral Filtering-Based Optical Flow Estimation With Occlusion Detection"; Computer Vision-ECCV 2006 Lecture Notes in Computer Science (LNCS), vol. 3951, 2006, pp. 211-224.

Imori et al: "A Segmentation-Based Multiple-Baseline Stereo (SMBS) Scheme for Acquisition of Depth in 3-D Scenes"; IEICE Transactions on Imformation and Systems, Information and Systems Society, Feb. 1998, pp. 215-223.

Hoiem et al: "Automatic Photo Pop-Up"; ACM Transactions on Graphics, Jul. 2005, pp. 577-584.

* cited by examiner

GENERATION OF DEPTH MAP FOR AN IMAGE

FIELD OF THE INVENTION

The invention relates to the generation of a depth map for an image and in particular, but not exclusively, to the generation of a depth map for a digital image comprising background and salient image objects.

BACKGROUND OF THE INVENTION

In recent years, the digitalization of images has become increasingly important for storage, manipulation, and distribution purposes. Furthermore, the digitalization of images allows complex manipulations and processing which provides opportunities not previously available. For example, in recent years significant research has been undertaken to provide algorithms for extracting depth information from images. Such depth information may provide three-dimensional (3D) information obtained from a two-dimensional (2D) image. Such 3D information may be used in many applications and may, for example, assist in automatic annotation of images. As another example, the 3D information may be used to generate enhanced images such as full or partial 3D images generated from 2D images.

Specifically, the recovery of depth maps from single images is currently a very active research area in computer vision, with applications that include 3D displays and autonomous robots. Some research is specifically targeted towards the conversion of existing videos and still images into a 3D format that can be rendered on auto-stereoscopic displays.

However, the applications face the basic obstacle that the 2D to 3D conversion task is fundamentally very difficult. Accordingly, most known approaches are heuristic and very few methods attempt the recovery of absolute depth or of the exact ordering of the depths of the various objects forming a scene.

In previous research, various depth cues have been investigated including focus/defocus, texture, scattering, shading, and perspective. However, these approaches tend to work only within restrictive conditions and result in poor quality depth maps that are not suitable for e.g. visualization tasks.

More recently machine learning systems have been attempted which are able to adapt the operation based on training images and known depth data for the training images (e.g. provided by a user). However, these approaches tend to require large training sets of image/depth map pairs, which tend to be available for very specific scenes only.

Hence, an improved approach for generating depth information for an image would be advantageous, and in particular a system allowing increased flexibility, easier implementation, reduced complexity, improved depth information, and/or improved performance would be advantageous.

SUMMARY OF THE INVENTION

Accordingly, the invention has for its object to mitigate, alleviate, or eliminate one or more of the above-mentioned disadvantages singly or in any combination.

According to an aspect of the invention, there is provided an image processing unit comprising: first means for generating a depth indication map for an image; second means for generating a modified depth indication map by filtering the depth indication map in response to image characteristics of the image; third means for generating an image depth map for the image in response to the modified depth indication map; the image depth map comprising data representing a depth of at least one image region of the image.

The invention leads to an improved image depth map being generated. In particular, an improved correspondence between the depth transitions and the image objects and/or improved depth data for e.g. background areas can be achieved. An easier implementation, in particular an implementation with low computational resource requirements, can be achieved in many embodiments. The invention can provide an efficient image depth map generation for an increased variety of images. For example, the approach may be suitable for images with irregular shapes.

According to an optional feature of the invention, the second means is arranged to modify a value of the depth indication map for a first picture element in response to an image characteristic of the first picture element of the image and at least one image characteristic of at least one picture element of the image in an image region proximal to the first picture element.

This can lead to an improved and/or easier generation of an image depth map. The feature may in particular provide an improved correspondence between depth transitions in the image depth map and borders of image objects and/or improved depth information for e.g. a background region to be determined from a predetermined depth profile.

According to an optional feature of the invention, the second means is arranged to modify a value of the depth indication map for a first picture element in response to a value in the depth indication map of a second picture element in a proximal image region.

This can lead to an improved and/or easier generation of an image depth map. The feature may in particular provide an improved correspondence between depth transitions in the image depth map and borders of image objects and/or improved depth information for a e.g. a background region to be determined from a predetermined depth profile. The modification may be iterative, and new modified values may be determined based on the values obtained in a previous iteration.

According to an optional feature of the invention, the depth indication map is an image object separation mask for the image, the image object separation mask indicating a separation of image objects and a background area.

The invention may provide, for example, an improved depth map with improved correspondence between depth transitions in the image depth map and borders of image objects.

The image object separation mask may be a saliency mask indicating which areas of the image are considered salient objects and which area is considered to be background (non-salient). The background area may be a disjoint area comprising disjoint background regions. The salient objects may be a cluster of possibly disjoint regions.

According to an optional feature of the invention, the first means is arranged to separate image objects and background in response to a color variance analysis of picture elements. Although a color variance analysis is preferable because of its effectiveness, other methods of analysis may be applied alternatively or in addition, such as an intensity variance analysis and/or texture variance analysis, or other methods of generating a saliency map known to those skilled in the art.

This can lead to an improved detection of image objects, such as salient objects, and in particular to a generation of large-granularity image object borders which are robust and/or suitable for refinement by filtering in response to image characteristics of the image.

According to an optional feature of the invention, the image object separation mask indicates a binary border between image objects and the background area.

This makes for an easier operation and/or improved performance. The image object separation mask can now indicate for each pixel either that it belongs to one specific image object or that it belongs to the background.

According to an optional feature of the invention, the second means is arranged to generate the modified depth indication map as an object separation mask by applying a threshold to filtered values of the depth indication map.

This can facilitate operation and/or improve performance, and in particular reduce the computational burden and/or provide an improved object separation mask after filtering.

According to an optional feature of the invention, the third means is arranged to generate a background depth map for the background area in response to a predetermined depth profile.

This can lead to a practical and low-complexity generation of a background depth map suitable for use with the filtered object separation mask, thereby rendering it possible for an improved image depth map to be generated.

According to an optional feature of the invention, the third means is arranged to modify the predetermined depth profile by filtering the predetermined depth profile in response to image characteristics of the image.

This renders it possible for an improved depth map to be generated. In particular, filtering of both the object separation mask and the predetermined depth profile will generate a depth map which has an improved correspondence between depth transitions in the image depth map and borders of image objects as well as improved depth data for the background area.

According to an optional feature of the invention, the third means is arranged to assign a depth value to an image object in response to a depth value of the background depth map for a neighboring proximal area.

This can lead to an improved and/or easier generation of an image depth map. In particular, it renders it possible for a depth map to be generated which has an accurate depth indication for image objects with accurate and potentially sharp borders, yet with consistency between the depth data for image objects and for the background.

According to an optional feature of the invention, the third means is arranged to assign a depth value to a picture element in response to assigned depth values for picture elements in a region proximal to the picture element, the assigned depth values being weighted in dependence on whether they are assigned to a picture element of an image object or to a picture element of the background area.

This can improve the depth information generated for image objects.

According to an optional feature of the invention, the third means comprises: means for assigning a depth value to an image object in response to a depth level algorithm; and means for modifying the background depth map in response to the depth level assigned to the image object.

This serves to improve the depth information to be generated. For example, improved depth information for a background region may be achieved. The depth value may be assigned, for example, in response to a depth cue that is independent of the background depth map, such as a parallax depth cue.

According to an optional feature of the invention, the depth indication map is a depth map.

The depth map may comprise a relative or absolute depth value for each picture element of the image (or a subset thereof). The depth map may be, for example, a background depth map and/or a predetermined depth profile.

According to an optional feature of the invention, the first means further comprises: means for determining an image object separation mask indicating a separation of image objects and a background area; and means for generating the depth map as a background depth map for the background area in response to a predetermined depth profile; wherein the third means is arranged to generate data for the image depth map for the background area in response to the modified depth map.

This can provide an improved and/or easier generation of an image depth map. In particular, the approach can provide a low-complexity generation of background depth information which reflects the actual image content while allowing salient objects to be assigned individual depth values.

According to an optional feature of the invention, the third means is arranged to assign a depth value to an image object in response to a depth value of the modified depth map for a neighboring background area.

This can provide an improved and/or easier generation of an image depth map. In particular, it renders it possible for a depth map to be generated which has an accurate depth indication for image objects with accurate and potentially sharp borders yet with consistency between the depth data for image objects and for the background.

According to an optional feature of the invention, the third means comprises: means for assigning a depth value to an image object in response to a depth level algorithm; and means for modifying the modified depth map in response to the depth level assigned to the image object.

This can lead to the generation of improved depth information. For example, improved depth information for a background region may be achieved. The depth value may be assigned, for example, in response to a depth cue which is independent of the background depth map, such as a parallax depth cue.

According to an optional feature of the invention, the third means is arranged to perform a noise reduction algorithm on the modified depth indication map.

This renders it possible for an improved image depth map to be generated which more closely reflects the image content.

According to another aspect of the invention there is provided a multi-view display device comprising an image processing unit including: first means for generating a depth indication map for an image; second means for generating a modified depth indication map by filtering the depth indication map in response to image characteristics of the image; and means for generating an image depth map for the image in response to the modified depth indication map; the image depth map comprising data representing a depth of at least one image region of the image.

According to another aspect of the invention there is provided a method of generating an image depth map, the method comprising the steps of: generating a depth indication map for an image; generating a modified depth indication map by filtering the depth indication map in response to image characteristics of the image; and generating an image depth map for the image in response to the modified depth indication map; the image depth map comprising data representing a depth of at least one image region of the image.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
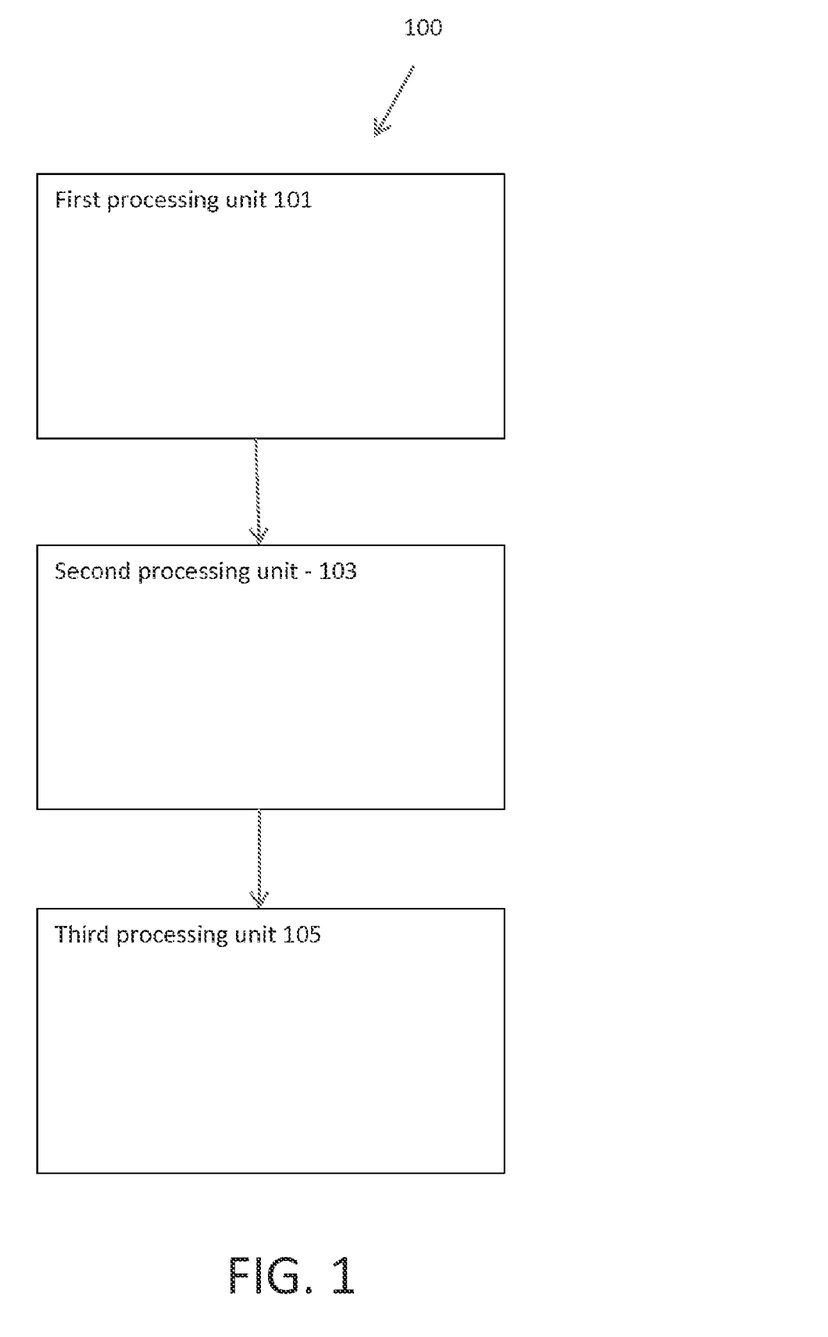
FIG. 1 illustrates an example of an image processing unit in accordance with some embodiments of the invention.

FIG. 1 illustrates an example of an image processing unit in accordance with some embodiments of the invention.

The image processing unit comprises a first processing unit 101 which is arranged to generate a depth indication map for an image. The image may be, for example, a digital picture or an image of a video sequence. The depth indication map comprises depth information data for the image, and specifically may comprise relative depth information for different regions of the image.

The depth indication map may comprise information on an estimated relative or absolute depth of different regions or picture elements, also referred to as pixels, of the image. As such, the depth indication map may be a depth map with depth data for different pixels indicating an absolute depth or a relative depth with respect to other picture elements or objects. For example, the depth indication map may comprise a value for each pixel indicating a depth level to which the pixel belongs taken from a finite number of depth levels specified for the image.

As another example, the depth indication map may be a map indicating where actual or potential depth transitions may occur in the image. For example, the depth indication map may be an image object separation mask which indicates the location (and/or shape, size, etc) of various image objects. As image objects may correspond to physical objects in the scene which are typically further forward than a background region, depth transitions typically occur around edges of image objects, and the image object separation mask is thus indicative of depth transitions in the image.

The first processing unit may generate the depth indication map directly, for example by means of an image object detection analysis. In other embodiments, the first processing unit 101 may alternatively or additionally generate the depth indication map by receiving or retrieving the depth indication map from another source. For example, the depth indication map may be a predetermined background depth map received along with the image or retrieved from a memory.

The first processing unit 101 is coupled to a second processing unit 103 which generates a modified depth indication map by filtering the depth indication map in response to image characteristics of the image. Thus, the second processing unit 103 modifies the depth indication map by filtering the depth indication map, but the modifications of the depth indication map are not only affected by the depth indication map itself but also by characteristics of the image itself. This renders it possible for a modified depth indication map to be generated which more accurately and closely reflects the image. For example, a much improved definition of the depth transitions (and the edges of the object) can be achieved for an image object separation mask. For a given depth map, an impression of the image can be imposed on the depth indication map, resulting in a depth map which better reflects the depth levels in the scene.

The second processing unit 103 is coupled to a third processing unit 105 which generates an image depth map for the image in response to the modified depth indication map. The image depth map comprises data representing a depth of at least one region of the image. The depth may be an absolute or a relative depth. In particular, the image depth map may comprise one depth level value for each pixel.

For example, if the depth indication map is an image object separation mask, the third processing unit 105 may generate a depth map by allocating a relative or absolute depth value to one, several, or all of the image objects. The third processing unit 105 may also allocate relative or absolute depth values to some or all of the background area, i.e. to areas of the image which are not part of an image object.

As another example, if the depth indication map is a background depth map, the third processing unit may, for example, combine depth information of the background and image objects to generate a complete depth map for the image. The third processing unit 105 may, for example, allocate depth values to image objects on the basis of the modified background depth map.

The image processing unit of FIG. 1 may thus provide an improved depth map for the image.

It will be appreciated that the processing units may be implemented as a single processing unit and that the described implementation may be in hardware, firmware, software, or may be a mix thereof. Specifically, the described processing may be implemented by a firmware or software routine executed by a suitable computer, microcontroller, digital signal processor, or other processing element.

In the following, a specific example of the generation of a depth mask in accordance with some embodiments of the invention will be described. In the specific example, a depth map is generated for an image by a sequence of steps including an image adaptive filtering of both an image object separation mask and a predetermined depth profile on the basis of image characteristics of the image.

A good example of a particularly advantageous method of image adaptive mask and/or depth map filtering is described in co-pending application EP06301011, which is incorporated herein by reference. This particular application proposes a method of image enhancement that can be used to enhance a saliency map, or a depth map of a scene based on e.g. color, or luminance information present in an image of substantially the same scene.

Figure 2:
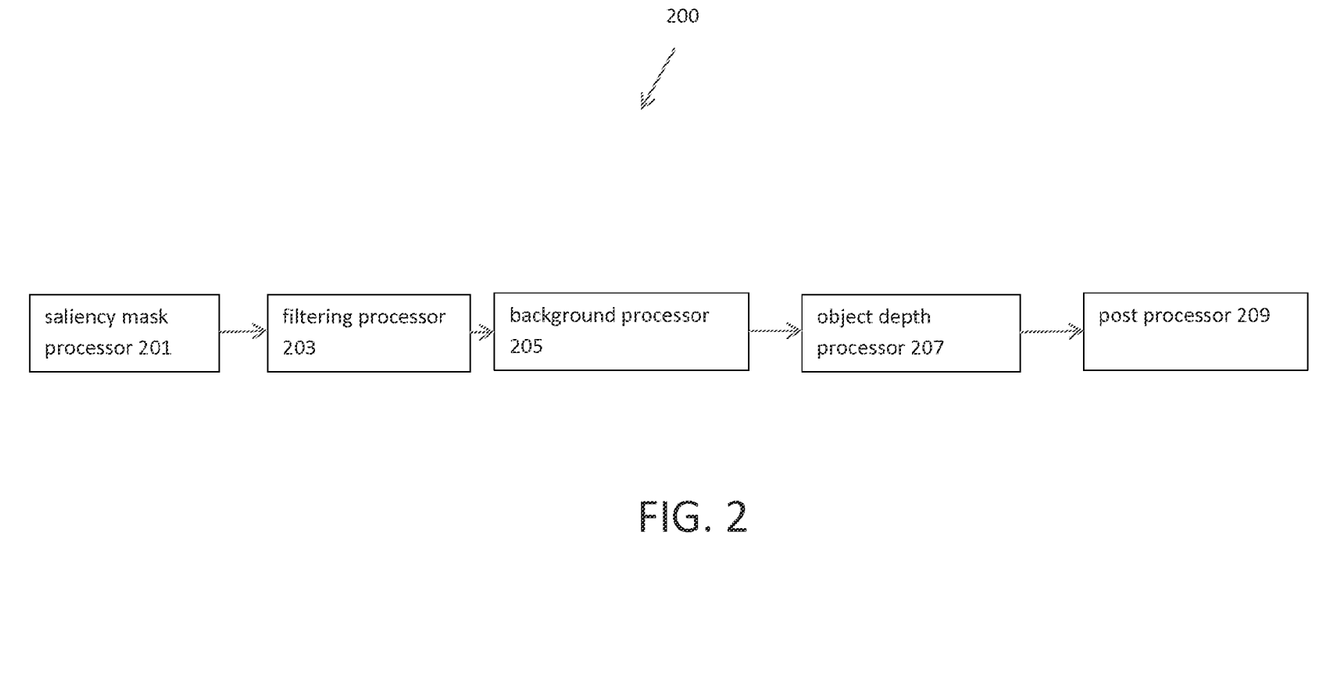
FIG. 2 illustrates an example of an image processing unit in accordance with some embodiments of the invention.
Figure 3:
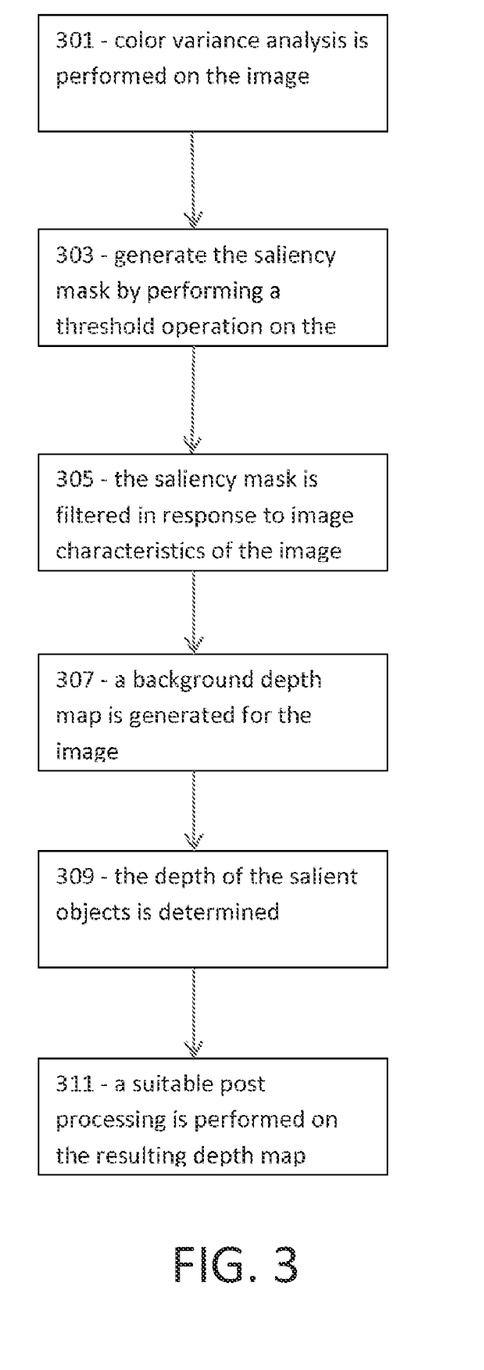
FIG. 3 illustrates an example of a method of generating an image depth map in accordance with some embodiments of the invention.

FIG. 2 illustrates an example of an image processing unit in accordance with some embodiments of the invention. FIG. 3 illustrates an example of a method of processing an image in accordance with some embodiments of the invention. In particular, FIG. 3 illustrates how a depth map may be generated by the image processing unit of FIG. 2.

In the example, the image processing unit is part of a multi-view display device and generates a depth map which is used by the device to generate a 3D image which is presented to the user. Based on this information, the multi-view display device can generate two or more correlated streams of video images for display on the multi-view display device. The two or more correlated streams of video images can be rendered via a lens or/and barrier system so that a viewer in front of the display receives slightly different images in his left and right eyes, resulting in a 3D impression. An example of such a rendering method is presented in "Real-time rendering for multiview autostereoscopic displays", by Berretty, R.-P. M.;

Peters, F. J.; Volleberg, G. T. G. Proceedings of the SPIE, Volume 6055, pp. 208-219 (2006).

The image processing unit comprises a saliency mask processor 201, which generates an image object separation mask (henceforth referred to as a saliency mask) for the image.

The saliency mask processor 201 specifically executes step 301 of FIG. 3, wherein a color variance analysis is performed on the image. Specifically, the local variance of colors in the neighborhood of each pixel of the image is computed. The color variance is a good indication of the visual importance of image features, and in particular a high variance typically corresponds to edges or borders of image objects in the image. These image objects are referred to as salient objects or areas and typically correspond to objects (or parts of objects) which are of high visual perceptual importance to a human viewer. In a beach image, for example, a parasol object in the foreground will typically have a significantly different color from the sand or sea, and a large color variance will therefore result for pixels around the edge of the parasol. It will be appreciated that an image object or salient object may correspond to part of a physical object in the image. For example, the parasol object may be comprised of a plurality of image objects corresponding to different color areas of the canopy of the parasol.

Although in this embodiment the color variance is used to generate the saliency mask, other algorithms may be used in addition to the color variance analysis or instead of the color variance analysis. These other algorithms may comprise, for example, luminance variance analysis, texture variance analysis, and/or other saliency mask generation techniques.

The finer details are not critical in the generation of the saliency mask by the saliency mask processor 201, and the variance analysis is mainly aimed at generating sizeable clusters of information-rich objects or of objects that stand out from their surrounding areas. Accordingly, the color variance is calculated on a coarse scale and highlights the most salient areas with a relatively high granularity.

Step 301 is followed by step 303, wherein the saliency mask processor 201 generates the saliency mask by performing a threshold operation on the color variance results. Specifically, applying a binary threshold to the color variance analysis results in a binary saliency mask.

Figure 4:
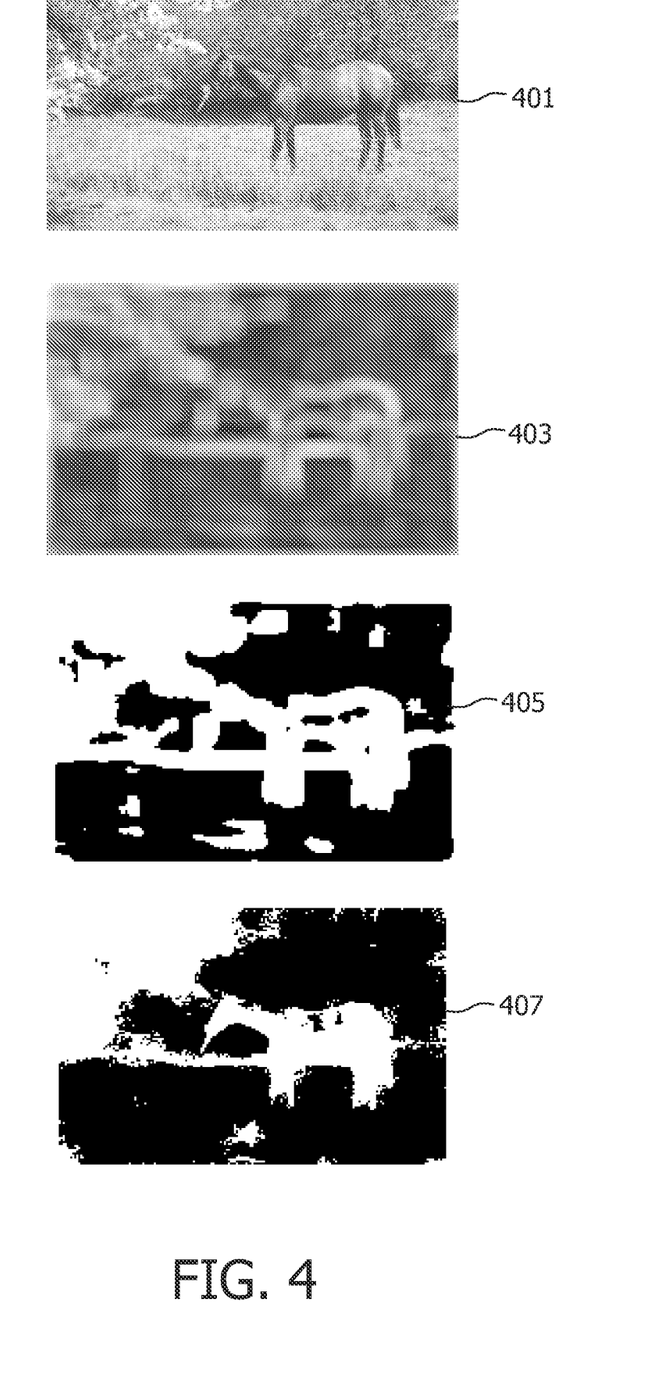
FIG. 4 illustrates examples of different steps in generating an image object separation map by a method in accordance with some embodiments of the invention.

An example of the image processing of an image of a horse in a field is illustrated in FIG. 4. The original image 401 is processed by the saliency mask processor 201 first to generate a variance map 403, to which subsequently a threshold value is applied to generate a binary saliency mask 405.

The saliency mask processor 201 is coupled to a filtering processor 203, which proceeds to execute step 305 wherein the saliency mask is filtered in response to image characteristics of the image. Specifically, the saliency mask is filtered such that the saliency value of a given pixel is determined in response to saliency values of pixels in a given proximal region. Furthermore, each of the saliency values is weighted in response to the degree of similarity between the image characteristics of the two pixels. Thus, an image adaptive filtering is applied wherein the depth indications (indicating likely step transitions) of the saliency mask are refined on the basis of the actual picture characteristics.

In particular, the coarse scale and the large footprint used for the variance analysis result in the boundaries of visually important regions in the saliency mask stretching beyond the actual object (or object cluster) boundaries in the images. To align the boundaries more accurately, the image adaptive filtering of the filtering processor 203 is applied to the mask.

In the specific example, this is performed by propagating salient and non-salient values in the mask in dependence on image property similarities of the corresponding pixels. Specifically, the filtering processor 203 implements an iterated weighted averaging of the saliency mask given by:

$$s_i^k = \sum_j \omega_{ij} s_j^{k-1}$$

where the current value of the saliency mask, $s_i^k$, at location i is computed from the previous values (obtained at iteration k−1) $s_j^{k-1}$ for neighboring pixels j (within a properly chosen footprint).

The saliency mask values are weighted by weights $\omega_{ij}$ which are dependent on the image characteristics of the corresponding pixels and specifically are dependent on the degree of similarity between these. Specifically, the weights may be functions that are monotonically decreasing with an increased difference between the image characteristic of the pixel for which the saliency value is being determined $c_i$ and the pixel for which the weight is being determined $c_j$:

$$\omega_{ij} = f(|c_i - c_j|)$$

This filtering will provide a much more accurate matching of the saliency mask to the image objects of the given image and will in particular provide an accurate saliency mask when used with a coarse variance analysis. Furthermore, the image adaptive filtering will provide a better depth map filling of the inside of salient objects.

The filtering processor 203 may furthermore provide a threshold operation following the filtering. Specifically, if the original salient mask is a binary mask, the image adaptive filtering will introduce non-binary values in the modified saliency mask. This may be converted back to a binary mask by applying a threshold.

FIG. 4 shows the modified saliency map 407 resulting from filtering and application of a threshold to the saliency mask 405. As can be seen, the salient objects are very well defined in this filtered map.

The filtering processor 203 is coupled to a background processor 205, which receives the image and the saliency mask. The background processor 205 executes step 307 wherein a background depth map is generated for the image. This background depth map will comprise depth values assigned to the background of the images. The term background is used to designate the non-salient region, i.e. the term background refers to the area of the image which has not been detected as a salient area by the filtering processor 203.

The generation of the background depth map is based on applying a predetermined default depth map which is subsequently modified by image adaptive filtering.

The background processor 205 proceeds to estimate the depth of the less salient regions in this manner. However, rather than simply applying a predetermined depth profile (such as a slant or grading), a predetermined profile is first filtered by the image itself. This image-adapting filtering results in an impression of the image content on the predetermined profile, which results in a more accurate and convincing depth perception. For many scenes, this image adaptive filtering may result in a depth map which has a depth ordering that is very close to the natural one. This may be particularly accurate for images showing large areas of the ground, the sky, and uniform areas with no sizeable foreground objects blocking the view. Accordingly, the approach is particularly suitable for depth determination for the less salient areas, which typically correspond to large uniform areas and similar regions, such as image areas corresponding to the sky, ground, etc.

The image adaptive filtering which is applied to the background depth profile may correspond to the image adaptive filtering applied to the saliency mask, i.e. the filtering may be substantially given by:

$$d_i^k = \sum_j \omega_{ij} d_j^{k-1}$$

where the current value of the background depth mask, $d_i^k$ at location i is computed from the previous values (obtained at iteration k−1) $d_j^{k-1}$ for neighboring pixels j (within a properly chosen footprint). The same weights as used for the saliency mask may be used for the background depth map.

Figure 5:
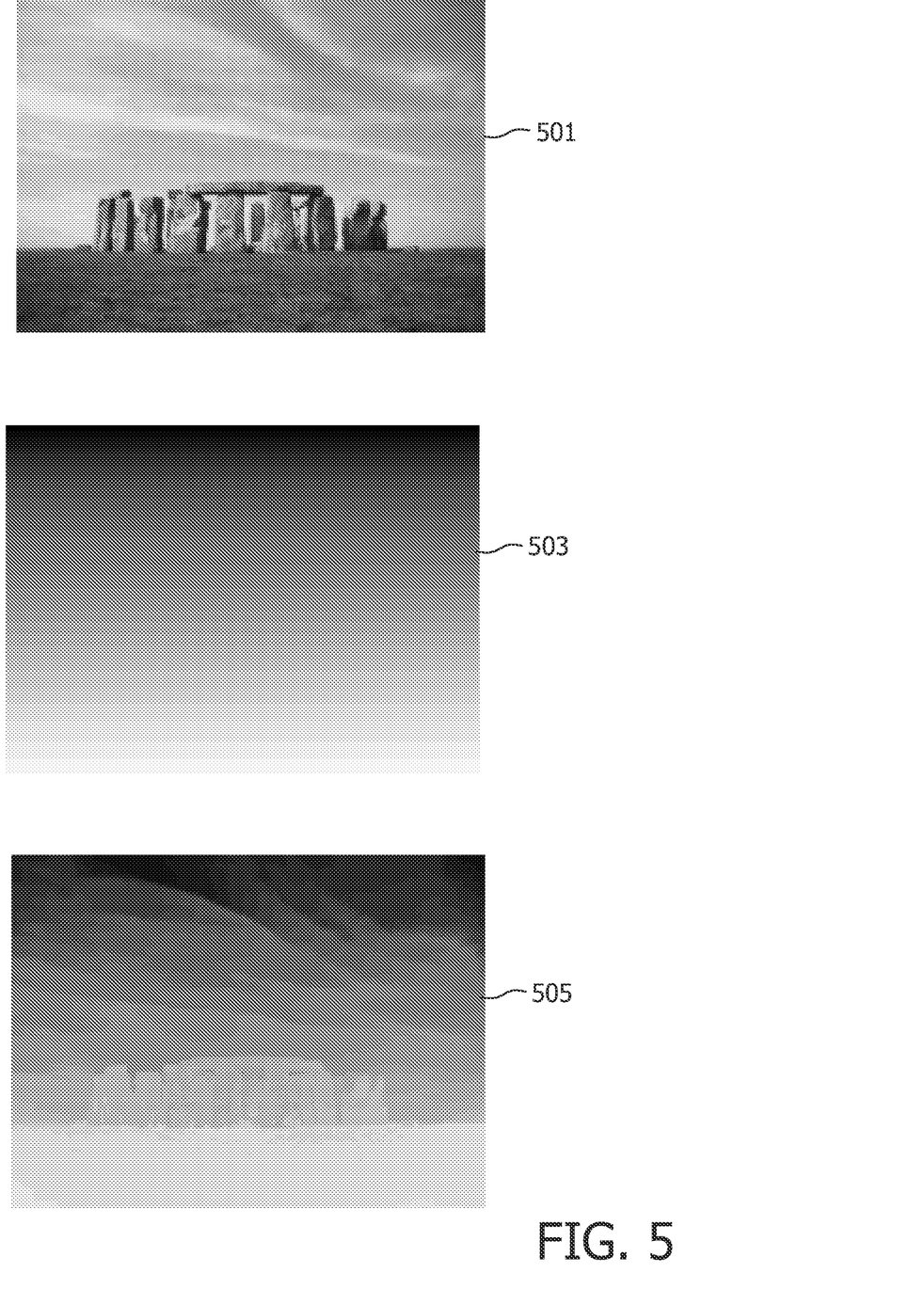
FIG. 5 illustrates examples of different steps in generating a background depth map by a method in accordance with some embodiments of the invention.

FIG. 5 illustrates an example of the approach applied to an image 501 of Stonehenge. In the example, a generic slant depth profile 503 is filtered using the above filter and based on the image 501, resulting in a background depth map 505. As can be seen, the image adaptive filtering has resulted in a background depth map which has the image impressed on the predetermined profile, thereby providing an improved depth map.

The background processor 205 is coupled to an object depth processor 207 which executes step 309 wherein the depth of the salient objects is determined. In the example, the depth is assigned to the salient objects in dependence on where they are located in the image and on the depth allocated to the neighboring background.

Specifically, the salient areas will typically correspond to objects that stand on the ground. The depth for these regions is determined through scanning of the image from the bottom to the top of the image. In some embodiments, the depth assigned to an object may simply be the depth of the background depth map at the point where the salient object is first detected by the scanning process, i.e. the depth of the background at the position where the salient object 'touches' the floor.

In other embodiments a more complex approach may be used, wherein the image depth assigned to a pixel is determined as a function of image depths in a region around the pixel. Specifically, the object depth processor 207 may consider all the pixels within a suitable footprint. All the pixels in the footprint which are not assigned a depth level are ignored, whereas all pixels which have already been assigned a depth level are averaged and the resulting depth level is assigned to the pixel. The averaging may typically be weighted such that pixels belonging to the same salient object are weighted higher than pixels belonging to the background. This weighting may be much stronger in that effectively a pixel of a salient object will be allocated the average depth level of surrounding pixels of the salient object unless the number of pixels is very low (or zero), in which case the background depth levels will be taken into account for the depth level.

The object depth processor 207 in scanning from the lower part of the depth map will thus check for each salient pixel the presence of neighboring salient pixels whose depth has already been assigned. It also checks for the non-salient pixels, but gives these a much lower weight. Objects with complex topologies have a significantly improved depth allocation to the salient objects in this approach. Also, the assignment of depth to the salient and non-salient areas can be implemented in a single scan that directly results in the combined depth map.

The object depth processor 207 generates a depth map for the image by combining the background depth map and the depth data for the salient regions. Specifically, the object depth processor 207 may overwrite any values in the background depth map corresponding to salient regions with the depth values determined by the above described approach. A resulting depth map for the image is thus derived.

In the example, the object depth processor 207 is coupled to a post processor 209 which executes step 311 wherein a suitable post processing is performed on the resulting depth map. Specifically, a noise reduction filtering may be performed on the depth map to generate an improved depth map. For example, a statistical processing may be applied which can reduce the noise while preserving the most important details in the depth map. Additional image information such as the location of boundaries may be also used in conjunction with the statistical noise removal process. As a specific example, low-pass spatial filtering may be applied. The low-pass filtering may be image adaptive.

In some embodiments, depth information on salient objects may be determined by means of a different depth level algorithm. For example, a different depth cue, such as a parallax cue, may be used to determine the depth level for a given salient object. In this case, the object depth processor 207 may use this depth information to allocate depth values to the salient objects.

The object depth processor 207 may be configured to use a variety of depth cues in order to establish depth from images. Many of these cues are closely linked to depth perception in the Human Visual System. Such depth cues may be based on a single image, so-called monocular cues, or on multiple images, such as binocular cues. It is well known to those skilled in the art how depth can be established from a binocular cue.

Multiple monocular cues over time may alternatively be used to establish what is known as a monocular movement parallax cue. In the case of a monocular movement parallax, the distance of an object to the camera influences the movement of the object in relation to the rest of the scene. When a moving camera is imaging stationary objects, for example, it holds that the smaller the distance to the camera, the greater the displacement in successive frames. Still other depth cues may be used to advantage including, for example, linear perspective that involves establishing the horizon line and vanishing points.

Alternatively or additionally, the object depth processor 207 may modify the assigned depth values of the background depth map in response to the depth values of the salient object. For example, the object depth processor 207 may filter the background depth map in a region around the lower border of the salient object such that the background depth at the position where the salient object touches the background is modified so as to be consistent with the depth of the salient object.

Specifically, the same filtering approach as described above for assigning depth values to a salient object on the basis of the background depth values may conversely be used to assign depth values to the background depth map on the basis of depth values assigned to the salient objects. Specifically, a filtering using a high weighting of salient pixels and a low weighting of non-salient pixels may be used in an area extending into the background area from the lower border of the salient object. By modifying the relative weights and the used footprint, a suitable impact of the salient object on the background depth map can be achieved.

It will be appreciated that for reasons of clarity the above description of embodiments of the invention was given with reference to various functional units and processors. However, it will be apparent that any suitable distribution of functions among individual functional units or processors may be used without detracting from the invention. For example, functions illustrated as being performed by separate processors or controllers may be performed by one and the same processor or controller. Hence, references to specific functional units are only to be seen as references to eligible means for performing the described function rather than indicative of a strict logical or physical structure or organization.

The invention may be implemented in any suitable form including hardware, software, firmware, or any combination of these. The invention may optionally be implemented at least partly as computer software running on one or more data processors and/or digital signal processors. The elements and components of an embodiment of the invention may be physically, functionally, and logically implemented in any suitable way. Indeed the functional operations may be implemented in a single unit, in a plurality of units, or as part of other functional units. As such, the invention may be implemented in a single unit or may be physically and functionally distributed over different units and processors.

The present invention has been described primarily with reference to single images, but it may alternatively be applied with equal advantage to individual frames of a video sequence. When applied to video, the use of a predetermined depth profile may be used to provide a depth cue in the absence of motion. It will be clear to those skilled in the art that for motion video the continuity of the generated depth maps over time is particularly relevant. In a preferred embodiment, therefore, the post-processing of depth maps generated in accordance with the present invention applies a temporal depth map enhancement that enables a depth-map propagation as described in co-pending application EP06301011.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, those skilled in the art will recognize that various features of the described embodiments may be combined in accordance with the invention. In the claims, the term comprising does not exclude the presence of other elements or steps.

Furthermore, although individually listed, a plurality of means, elements, or method steps may be implemented by a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate. Furthermore, the order of features in the claims does not imply any specific order in which the features must be implemented, and in particular the order of individual steps in a method claim does not imply that the steps must be performed in this order. Rather, the steps may be performed in any suitable order. In addition, singular references do not exclude a plurality. Thus references to "a", "an", "first", "second", etc., do not preclude a plurality. Reference signs in the claims are provided merely as a clarifying example and shall not be construed as limiting the scope of the claims in any way.

The invention claimed is:

1. An image processing unit comprising:
   first means (101) for generating an image object separation mask for an image, the image object separation mask indicating a separation of image objects and a background area;
   second means (103) for generating a modified image object separation mask by filtering the image object separation mask, the filtering being adapted in response to image characteristics of the image, the image characteristics representing at least one of luminance characteristics and color characteristics;
   third means (105) for generating an image depth map for the image in response to the modified image object separation mask; the image depth map comprising data representing a depth of at least one image region of the image.

2. The image processing unit of claim 1, wherein the second means (103) is arranged to modify a value of the image object separation mask for a first picture element in response to an image characteristic of the first picture element of the image and at least one image characteristic of at least one picture element of the image in an image region proximal to the first picture element.

3. The image processing unit of claim 1, wherein the second means (103) is arranged to modify a value of the image object separation mask for a first picture element in response to a value in the image object separation mask of a second picture element in a proximal image region.

4. The image processing unit of claim 1, wherein the first means (101, 201) is arranged to separate image objects from background in response to a color variance analysis of picture elements.

5. The image processing unit of claim 1, wherein the image object separation mask indicates a binary border between image objects and the background area.

6. The image processing unit of claim 1 wherein the second means (103, 203) is arranged to generate the modified depth indication map as an object separation mask by applying a threshold to filtered values of the depth indication map.

7. The image processing unit of claim 1, wherein the third means (105, 205) is arranged to generate a background depth map for the background area in response to a predetermined depth profile.

8. The image processing unit of claim 7, wherein the third means (105, 205) is arranged to modify the predetermined depth profile by filtering the predetermined depth profile in response to image characteristics of the image.

9. The image processing unit of claim 7, wherein the third means (105, 207) is arranged to assign a depth value to an image object in response to a depth value of the background depth map for a proximal background area.

10. The image processing unit of claim 7, wherein the third means (105, 207) is arranged to assign a depth value to a picture element in response to assigned depth values of picture elements in a region proximal to the picture element, the assigned depth values being weighted in dependence on whether they are assigned to a picture element of an image object or to a picture element of the background area.

11. The image processing unit of claim 7, wherein the third means (105, 207) comprises:
   means for assigning a depth level value to an image object in response to a algorithm; and
   means for modifying the background depth map in response to the depth level assigned to the image object.

12. The image processing unit of claim 1, wherein the third means (105, 209) is arranged to perform a noise reduction algorithm on the modified image object separation mask.

13. A multi-view display device comprising an image processing unit including:
- means (101) for generating a image object separation mask for an image, the image object separation mask indicating a separation of image objects and a background area;
- means (103) for generating a modified image object separation mask by filtering the image object separation mask in response to image characteristics of the image, the image characteristics reprepresenting at least one of luminance characteristics and color characteristics; and
- means (105) for generating an image depth map for the image in response to the modified image object separation mask; the image depth map comprising data representing a depth of at least one image region of the image.

14. A method of generating an image depth map, the method comprising the steps of:
- in an image processing unit,
  - generating (301, 303, 307) a image object separation mask for an image, the image object separation mask indicating a separation of image objects and a background area;
  - generating (305, 307) a modified image object separation mask by filtering the image object separation mask in response to image characteristics of the image, the image characteristics representing at least one of luminance characteristics and color characteristics; and
  - generating (309, 311) an image depth map for the image in response to the modified image object separation mask; the image depth map comprising data representing a depth of at least one image region of the image.

15. Computer readable non-transitory medium including code for generating an image depth map, the medium comprising:
- code for generating (301, 303, 307) a image object separation mask for an image, the image object separation mask indicating a separation of image objects and a background area;
- code for generating (305, 307) a modified image object separation mask by filtering the image object separation mask in response to image characteristics of the image, the image characteristics representing at least one of luminance characteristics and color characteristics; and
- code for generating (309, 311) an image depth map for the image in response to the modified image object separation mask; the image depth map comprising data representing a depth of at least one image region of the image.

* * * * *